(12) United States Patent
Bendelac et al.

(10) Patent No.: US 6,845,102 B1
(45) Date of Patent: *Jan. 18, 2005

(54) METHOD AND SYSTEM FOR NETWORK ACCESS OVER A LOW BANDWIDTH LINK

(75) Inventors: Chaim Bendelac, Kfar-Saba (IL); Ran M. Bittmann, Tel-Aviv (IL); Kobi Samburski, Herzliya (IL)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,534

(22) Filed: Oct. 9, 1997

(51) Int. Cl.⁷ .............................. H04L 12/28; H04J 3/16
(52) U.S. Cl. ...................................... 370/401; 370/465
(58) Field of Search ................................. 370/352, 401, 370/402, 404, 405, 406, 465, 466, 467; 707/10, 101, 9, 100, 104, 513; 709/203, 217, 216, 219, 220, 228, 227, 236, 311

(56) References Cited

U.S. PATENT DOCUMENTS

| | | | |
|---|---|---|---|
| 4,922,486 A | 5/1990 | Lidinsky et al. | 370/60 |
| 4,971,407 A | 11/1990 | Hoffman | 341/87 |
| 5,014,265 A | 5/1991 | Hahne et al. | 370/60 |
| 5,155,847 A * | 10/1992 | Kirouac et al. | 709/216 |
| 5,224,099 A | 6/1993 | Corbalis et al. | 370/94.2 |
| 5,280,470 A | 1/1994 | Buhrke et al. | 370/13 |
| 5,305,311 A | 4/1994 | Lyles | 370/60 |
| 5,541,957 A | 7/1996 | Lau | 375/258 |
| 5,592,470 A | 1/1997 | Rudrapatna et al. | 370/320 |
| 5,610,910 A * | 3/1997 | Focsaneanu et al. | 370/351 |
| 5,717,604 A | 2/1998 | Wiggins | 364/514 C |
| 5,729,546 A | 3/1998 | Gupta et al. | 370/434 |
| 5,745,556 A | 4/1998 | Ronen | 379/127 |
| 5,761,280 A * | 6/1998 | Noonen et al. | 379/93.27 |
| 5,761,662 A * | 6/1998 | Dasan | 707/10 |

(List continued on next page.)

FOREIGN PATENT DOCUMENTS

EP 0797342 9/1997 .......... H04M/11/08

Primary Examiner—Andy Lee
(74) Attorney, Agent, or Firm—Thelen Reid & Priest; David B. Ritchie

(57) ABSTRACT

A method and system are provided for transmitting information from a faster network to a data terminal via a slower network connection. The invention is adapted for use with any Internet access device or terminal, such as an Internet-compatible telephone. A client connects to the Internet via an intermediary software program, known as the Gateway (GW). In the preferred embodiment of the invention, the GW executes on a host computer of an ISP's Local Area Network (LAN). The GW thus mediates the data transfer between the Internet, such as the Web, and the client Internet terminal. The GW employs a point-to-point Internet protocol, the Gateway Interface Protocol (GWIP) to communicate with the client over the low-bandwidth link. The invention shifts the entire overhead of the Internet protocol stack to the GW, and does not involve the Internet terminal or the slow link between Internet terminal and GW. The GW makes and negotiates multiple Internet requests, in parallel, and multiplexes the resulting data streams, allowing documents to be loaded in parallel with their associated images. The GW may also be used to conveniently customize or upgrade the Internet terminal. The GW performs off-line services and caches commonly used information fetched from the Internet. The invention is also readily adapted for use with Internet access devices that require different document formats.

59 Claims, 4 Drawing Sheets

U.S. PATENT DOCUMENTS

| | | | |
|---|---|---|---|
| 5,768,521 A | | 6/1998 | Dedrick ................. 395/200.54 |
| 5,778,182 A | | 7/1998 | Cathey et al. ......... 395/200.49 |
| 5,787,470 A | * | 7/1998 | DeSimone et al. ......... 711/124 |
| 5,799,040 A | | 8/1998 | Lau ............................ 375/258 |
| 5,905,736 A | * | 5/1999 | Ronen et al. ............... 370/546 |
| 5,960,409 A | | 9/1999 | Wexler ........................ 705/14 |
| 5,970,477 A | | 10/1999 | Roden ......................... 705/32 |
| 6,006,231 A | * | 12/1999 | Popa .......................... 707/101 |
| 6,018,619 A | | 1/2000 | Allard et al. .......... 395/200.54 |
| 6,018,770 A | * | 1/2000 | Little et al. .................. 709/223 |
| 6,026,087 A | * | 2/2000 | Mirashrafi et al. .......... 370/389 |
| 6,026,440 A | | 2/2000 | Shrader et al. ............. 709/224 |
| 6,035,281 A | | 3/2000 | Crosskey et al. .............. 705/14 |
| 6,052,730 A | * | 4/2000 | Felciano et al. ............ 709/225 |
| 6,421,429 B1 | * | 7/2002 | Merritt et al. ........... 379/93.17 |

* cited by examiner

METHOD AND SYSTEM FOR NETWORK ACCESS OVER A LOW BANDWIDTH LINK

BACKGROUND OF THE INVENTION

1. Technical Field

The invention relates to data communication networks. More particularly, the invention relates to transmitting information from a faster network to a data terminal via a slow network connection.

2. Description of the Prior Art

Electronic commercial and academic computer networks have been in existence for many years. An example of a commercial network is America On-Line. The largest and best-known electronic network is commonly known as the Internet. The Internet is a world-wide "network of networks" that is composed of thousands of interconnected computers and computer networks.

The preferred protocol of communications on the Internet is a set of standards and protocols, commonly referred to as TCP/IP. These TCP/IP protocols provide the means to establish a connection between two nodes on the network, and to subsequently transfer messages and data between these nodes. TCP (Transmission Control Protocol) provides the logical connection to ensure delivery of an entire message or file, while IP (Internet Protocol) provides the routing mechanism.

The majority of residential and commercial users of such computer networks (the clients) do not have a direct connection to the network. They subscribe to the services of an access provider, commonly called "Internet Service Provider" (ISP) in the case of the Internet. Clients use a personal computer or other terminal that is equipped with a data modem, to dial into the ISP connection service.

FIG. 1 is a diagram of the topology of an Internet connection via an ISP, according to the prior art. The ISP maintains a network 10 that connects its clients to the Internet 26. This network includes the ISP backbone 12, which is an internal set of connected nodes. ISP backbones are typically connected to points of presence, known as POPs 14, and management (control) centers 16. The POP is typically the local exchange that users dial into via modem. There are usually few management centers and many POPs in an ISP backbone.

The ISP typically connects to the Internet via a Local Area Network (LAN) 28 at the management center. However, the ISP host may also be connected to the Internet via a Wide Area Network (WAN) such as the X.25 style Public Data Network (PDN). The LAN communicates with the Internet 26 through a physical, wide-bandwidth connection 30. However, the client does not connect to the LAN through such wide-bandwidth connection. Rather, the client accesses the Internet by using a computer 18 with a modem 20 to dial up, through the public telephone system 22, another modem in a local POP 24. This modem-to-modem connection is a relatively slow, low bandwidth two-directional link.

The ISP usually provides a relatively slow point-to-point (serial) two-dimensional link, through which the client communicates directly to the Internet, using the Internet standard TCP/IP protocols. Such serial link transfers digital data one bit after the other. The Recommended Standard-232 (RS-232) is the standard commonly followed for serial data transmission. (See, for example, *Electronic Industries Association*, EIA Standard RS-232-C, "Interface Between Data Terminal Equipment and Data Communications Equipment Employing Serial Binary Data Interchange", August 1969.)

Point-to-point links are among the oldest methods of data communications and almost every host supports point-to-point connections. A long-distance point-to-point link is achieved by using a modem to establish a dial-up link between a display terminal, such as a personal computer, and the other host, such as a host located on the ISP site.

The communication over the serial point-to-point line is in the form of encapsulated (framed) TCP/IP datagrams (data packets) using either Serial Line Internet Protocol (SLIP) or Point-to-Point protocol (PPP) packet framing.

The SLIP protocol is described in *IETF Network Working Group* (J. Romkey), "A NONSTANDARD FOR TRANSMISSION OF IP DATAGRAMS OVER SERIAL LINES: SLIP," Request for Comments: 1055—June 1988. The PPP protocol is described in *IETF Network Working Group* (D. Perkins), "The Point-to-Point Protocol for the Transmission of Multi-Protocol Datagrams Over Point-to-Point Links," Request for Comments: 1171. SLIP transmits IP data packets over any serial link, such as a telephone line. It is generally used to provide Internet access to networks that support TCP/IP. PPP is a more common data link protocol that provides dial-up access over serial lines.

FIG. 2 is a diagram of a traditional Internet connection according to the prior art. To communicate on the Internet 26, an appliance or terminal (the client) 18 establishes a logical connection with a content provider. This connection is typically made using dial-up equipment, such as a modem 46 to connect to the public telephone system 22. The information transmitted over the telephone line is composed of PPP-wrapped TCP/IP data packets. Essentially, the ISP 10. is a transparent channel through which the client directly communicates with content providers, such as Web sites 51.

There are several disadvantages to this prior art approach. One major disadvantage is that of cost and complexity. Each terminal must be equipped with the ability to handle TCP/IP and PPP or SLIP protocols. This can require as much as 90 Kbytes of code and 70 Kbytes of data. Another major disadvantage is that of a need for a relatively high bandwidth. The Internet protocol overhead must be transmitted through the slow serial link, thereby reducing the actual useful bandwidth.

Yet another disadvantage is the need to duplicate, in each terminal, the code to deal with every possible type of data that may be transferred. Additionally, the established connection between the client and the Web server is recreated for every required file. This prevents a more general solution where commonly fetched files or messages are cached.

The World-Wide Web (Web) is an Internet client-server distributed information retrieval system. On the Web documents, menus, and indices are represented to the user as hypertext objects. Hypertext is a collection of documents containing cross-references or "links". These links enable the user, with the aid of an interactive browser program, to move from one document to another.

The Web may be accessed through other types of devices than a computer, including personal data assistants, fax machines, and Internet-capable telephones. One device that can provide Internet access is the terminal described in M. Valentaten, B. Moeschen, Y. Friedman, Y.-T. Sidi, Z. Bikowsky, Z. Peleg, Multi-Mode Home Terminal System that Utilizes a Single Embedded General Purpose/DSP Processor and a Single Random Access Memory, U.S. Pat. No. 5,259,940 (Oct. 5, 1993).

An internet access device, such as a modem-connected personal computer, generally uses a software application known as a Web browser to access the Web information available on the Internet. Such Web browsers, including Navigator, manufactured by Netscape Communications Corporation of Mountain View, Calif., and Mosaic, owned by the National Center for Supercomputing Applications (NCSA) at the University of Illinois, Urbana-Champaign, use a direct connection to the Web over SLIP/PPP. Thus, all of the overhead, in particular the parallel protocol overhead, is over the slow link.

To mitigate the above-mentioned disadvantages, prior art solutions that do not require the display terminal to handle the TCP/IP protocol set have been used to access the Internet. One such solution is for the user to acquire a shell account on the ISP host computer. With a shell account, a simple text transfer protocol and a terminal-emulator program are used to permit the user to communicate with the Internet through the display terminal, using a text-only Web browser program. One such text-only Web browser is Lynx, developed by the University of Kansas and currently maintained by Foteos Macrides at the Worcester Foundation for Biological Research. However, the shell account approach is subject to the major disadvantage that only plain-text information, and not images, colors, and sounds can be viewed.

Another prior art approach is that of the commercial Internet Web browser SlipKnot, developed by MicroMind, Inc. SlipKnot permits Web browsing through a serial link to a server, typically a Unix server, using a simple dial-in program. A TCP/IP stack is not required. When a user selects a hyperlink using SlipKnot, a textual description of the hyperlink is transferred to the ISP. SlipKnot uses the capabilities of the shell account to execute an "agent" program (such as Lynx) on the ISP machine. This agent fetches the requested multimedia file and uses a data-transfer program, such as xmodem, to transfer the file to the display terminal for display.

However, SlipKnot can be inconvenient to use and install. Furthermore, because the agent program is invoked separately for each separate request, information transfer is inefficient and slow. The SlipKnot method can handle only one request at a time and allows only local caching on the client.

It would therefore be an advantage to provide a method and system that improves the transfer of information from a faster network to a data terminal via a low-bandwidth link. It would be a further advantage if such method and system filters irrelevant Internet information prior to its transfer over the low-bandwidth link. It would be yet another advantage if such method and system reduces, if not entirely eliminates, protocol negotiation over the low-bandwidth link.

SUMMARY OF THE INVENTION

The invention provides a method and system for transmitting information from a faster network to a data terminal via a slower network connection. The preferred embodiment of the invention is adapted for use with any Internet terminal or access device, such as a telephone. A client connects to the Internet via an intermediary software program, known as the Gateway (GW). In the preferred embodiment of the invention, the GW executes on a host computer of an ISP's Local Area Network (LAN.

The client dials up a Remote Access Server located at the ISP's local point-of-presence. The Remote Access Server communicates, via the ISP's backbone and using the TCP/IP network, with an authentication server. Initial authentication on the incoming calls is performed and the logical connection to the GW is established. The GW, in turn, uses the ISP's communication network and the TCP/IP protocol to connect to the Internet.

The GW thus mediates the data transfer between the Internet, such as the Web, and the client Internet terminal. The GW employs a point-to-point Internet protocol, the Gateway Interface Protocol (GWIP) to communicate with the client over the low-bandwidth link. The invention shifts the entire overhead of the Internet protocol stack to the GW, and does not involve the Internet terminal or the slow link between Internet terminal and GW. The Internet terminal needs no IP address. A single IP address is used by the GW to represent all Internet terminals.

The GW makes and negotiates multiple Internet requests, in parallel, for information to be fetched and loaded from the Internet using the GWIP protocol. The GW parses all requests and forwards them to the appropriate Internet server for execution. The GW filters each received file according to file type, and multiplexes the resulting data streams efficiently over the single link to the Internet terminal, based on the current priority of each stream. This allows documents to be loaded in parallel with their associated images, resulting in a much improved perceived speed. These streams can be paused and resumed as desired, according to a predetermined or dynamic priority. Such parallel retrieval of multiple objects is performed over the slow link without the use and overhead of Internet protocols.

The GW may also be used to conveniently customize the Internet terminal. In one embodiment of the invention, a profile of the Internet terminal user is stored in the Internet terminal. The GW uses this profile to provide customized services, such as sending only thumbnail views of images, or not sending certain material. In another embodiment of the invention, the GW serves as a software upgrade server. Using the GWIP protocol, a new firmware version can easily be uploaded, or a specialized device driver such as a printer driver uploaded as necessary. The invention may be used to upgrade or modify the graphical user interface of the Internet terminal.

In an alternative embodiment of the invention, the GW performs off-line services, such as collecting e-mail, or conducting intelligent off-line searches. The GW can be used to cache commonly used information fetched from the Internet. In one embodiment of the invention, the GW is used as a mechanism for ISPs to track and bill customers for the use of the internet connection.

The invention is also readily adapted for use with Internet access devices that require different document formats and have different display capabilities, such as an Internet-compatible telephone, computer, a cellular phone, or a personal digital assistant having a wireless phone. In the preferred embodiment of the invention, the HTML layout is converted to a compressed equivalent of the HTML layout. Alternative embodiments of the invention do not convert the HTML layout, or convert the HTML to different screen formats.

DETAILED DESCRIPTION OF THE INVENTION

The invention provides a method and system for transmitting information from a faster network to a data terminal via a slower network connection.

The preferred embodiment of the invention is adapted for use with the Web technique described above. However, alternative embodiments of the invention are adapted for use with any Internet access device. Thus, the following discussion is provided for purposes of example and not as a limitation on the scope of the invention.

The Web is usually accessed via telephone lines by a modem-connected computer, or Internet access terminal. The client dials up an ISP, for example using the PPP protocol. In turn, the ISP host establishes the connection to the Internet.

In the invention, however, the client connects to the Internet via an intermediary software program, known as the Gateway (GW). The GW mediates the data transfer between the Internet, such as the Web, and the client computer/Internet access terminal. The GW employs a point-to-point Internet protocol, the Gateway Interface Protocol (GWIP) to communicate with the client over the low-bandwidth link. The invention thereby shifts the burden of processing the Internet protocol stack stack to the GW, and does not involve the Internet terminal or the slow link between Internet terminal and GW.

Figure 1:
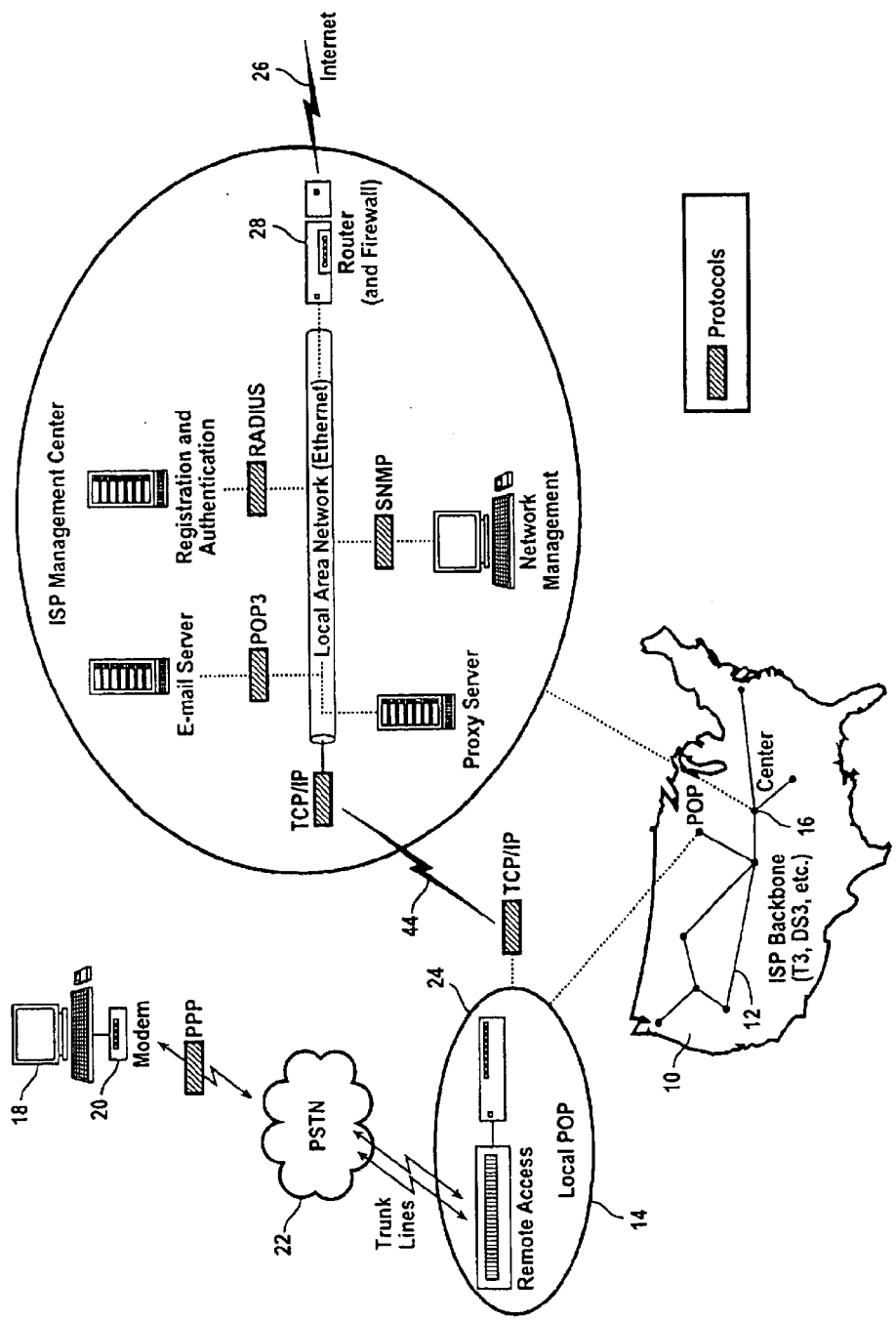
FIG. 1 is a diagram of the topology of an Internet connection via an ISP according to the prior art.
Figure 2:
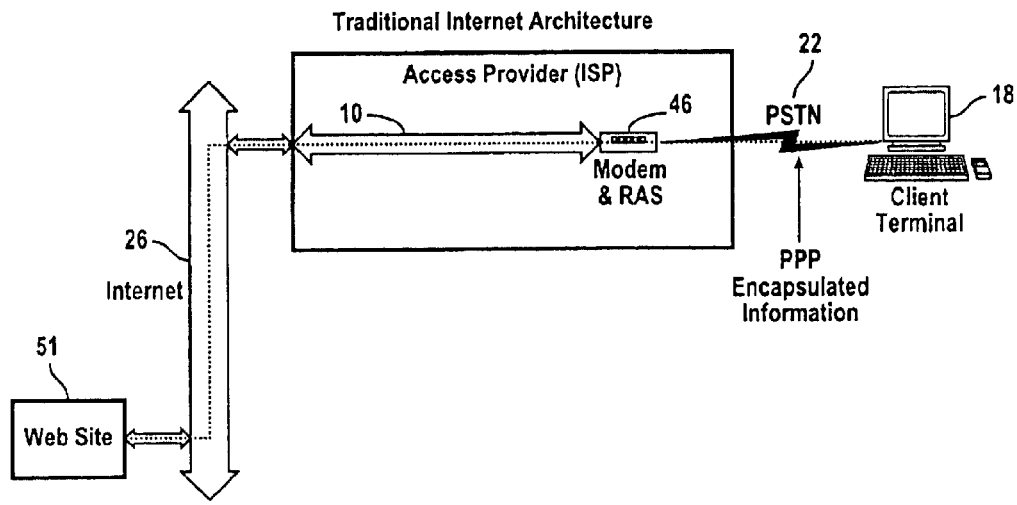
FIG. 2 is a diagram of a traditional Internet connection according to the prior art.
Figure 3:
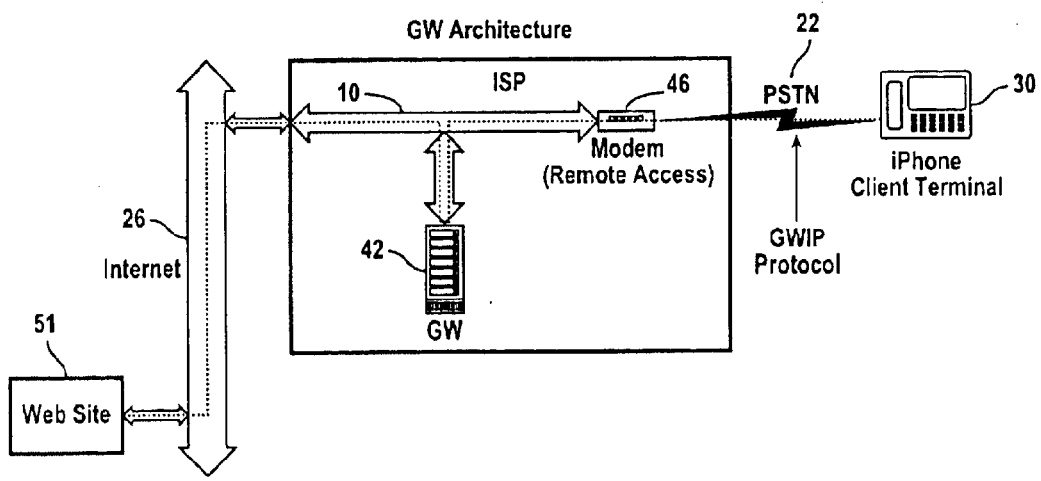
FIG. 3 is a diagram of the GW architecture according to the invention.

FIG. 3 is a diagram of the GW architecture according to the invention. The invention framework includes a GW 42 that functions as an intermediary between client devices 30, such as an Internet-compatible telephone, and content providers, such as Web sites 51. Therefore, the GW, integrated into the ISP network, mediates access to the Internet on behalf of its clients.

Figure 4:
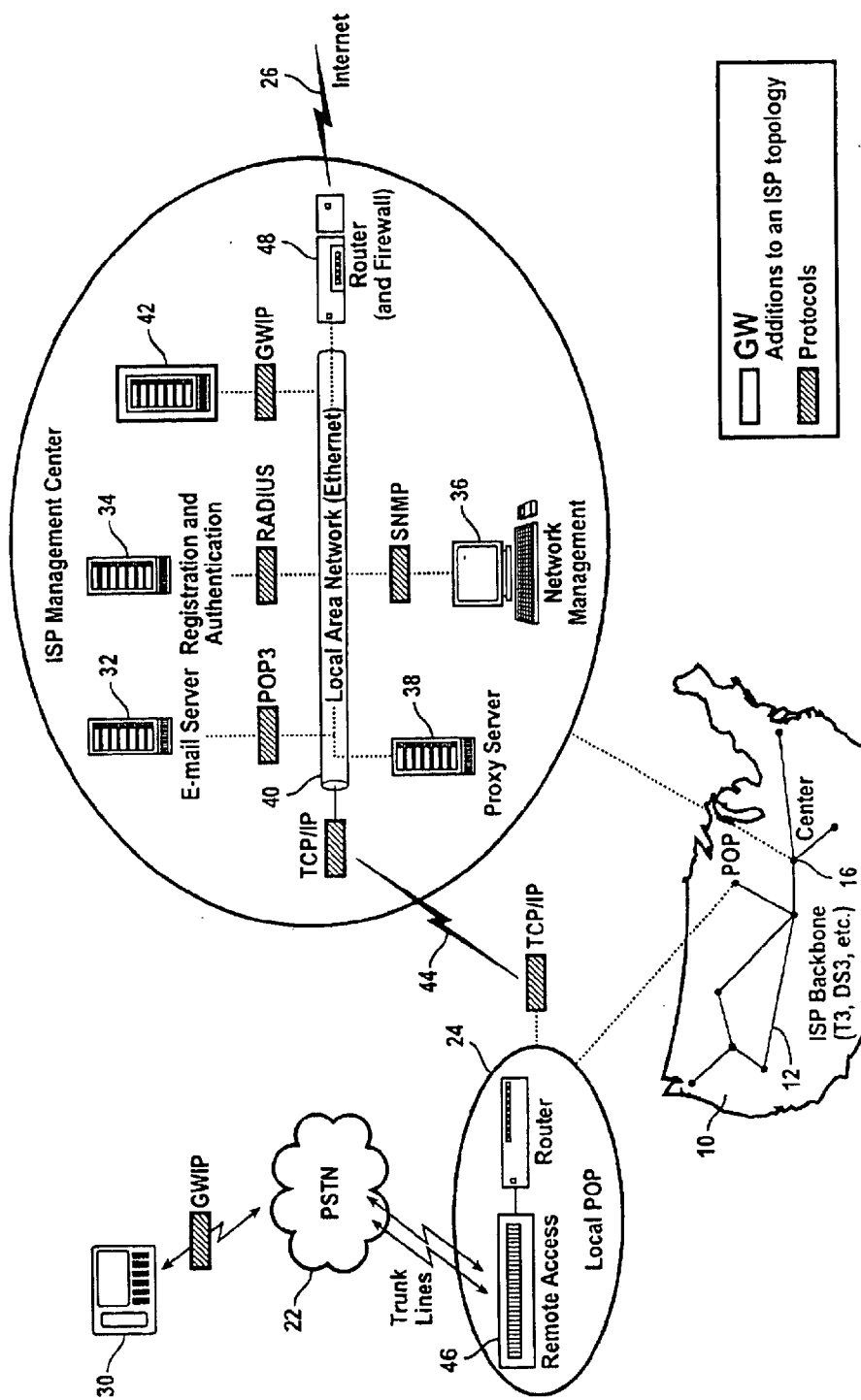
FIG. 4 is a diagram of the topology of an Internet connection via an ISP according to the invention.

FIG. 4 is a diagram of the topology of an Internet connection via an ISP according to the preferred embodiment of the invention. In the invention, the Internet terminal 30 uses the public telephone system 22 to dial up a local POP 24 within the ISP backbone 12. The GW, which is integrated into the ISPs network 10, mediates access to the Internet on behalf of its clients. The GW is a seamless software addition to standard ISP network configurations.

The ISP's E-mail servers 32, authentication servers 34, network management control 36, and proxy servers 38 are typically located at a management center 16. In the preferred embodiment of the invention, the GW 42 is also located at the management center. The GW preferably executes on a host computer of the ISP's Local Area Network (LAN) 40 with other computers and servers, such as the E-mail servers, network management servers, and authentication servers. However, the GW may also be executed by a dedicated server mediating between the LAN and the client.

The client uses the Internet terminal 30 to dial and connect to a dial-up Remote Access Server 46 which is located at the ISP's local POP 24. This Remote Access Terminal Server communicates, via the ISP's backbone 12 and using the TCP/IP network 44, with an authentication server 34. Initial authentication on the incoming calls is performed and the logical connection to the GW is established. The GW, in turn, uses a router 48 to connect to the Internet 26.

Figure 5:
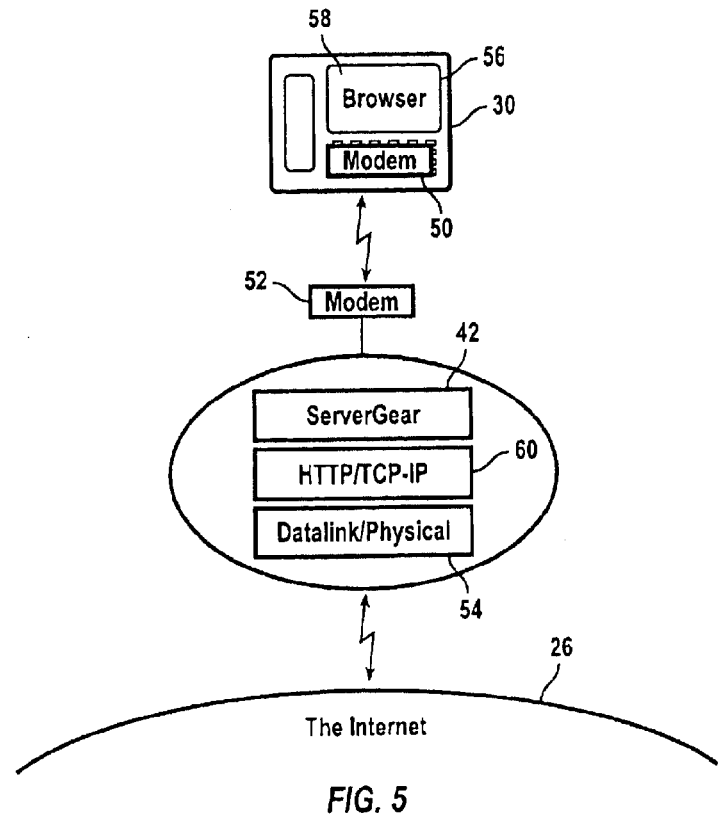
FIG. 5 is a diagram showing the topology of an Internet terminal connection to the Internet according to the invention.

FIG. 5 is a diagram showing the topology of an Internet terminal connection to the Internet according to the invention. The Internet terminal 30 uses a modem 50 to dial-up a modem 52 at the ISP's local POP. This modem can be a hardware device that is located internal or external to the Internet terminal, or can be an integrated software modem. This modem 52 transmits information from the client to the GW 42 on the LAN. The GW uses Hypertext Transfer Protocol and TCP/IP protocol 60 to communicate, via a datalink 54 to the Internet 26. The Internet terminal displays the information retrieved from the Internet on its display screen 56 using a browser application 58.

The GW executes on a host computer with a physical, wide-bandwidth connection to the Internet. However, the client computer does not have such a wide-bandwidth connection to the Internet. Rather, the client computer must connect to the Internet through a low-bandwidth slow link.

The GW employs an extremely simple point-to-point Internet protocol, referred to hereafter as the Gateway Interface Protocol (GWIP) to communicate with the Internet terminal over this relatively slow, low-bandwidth link. The GW then negotiates Internet requests on behalf of the Internet terminal over the fast, wide-bandwidth link. The function of the GW is, therefore, to serve as an agent or representative of the Internet terminal, and to negotiate Internet access on its behalf. As a result, the entire overhead burden of the Internet protocol stack is handled by the GW, and does not involve the Internet terminal or the slow link between Internet terminal and GW.

A request is a signal sent from a transmitting station to a receiving station requesting permission to transmit information. This permission is given with a response. The GW examines, pre-processes and modifies (filters) the Internet terminal's Internet requests and responses to improve performance and utility. The invention is particularly useful in the context of Internet display terminals, such as the Internet-compatible telephone, having a low bandwidth connection and limited storage capabilities.

A Web page is encoded in Hypertext Markup Language (HTML). An HTML document is a plain-text (ASCII) file that uses tags to denote the various elements in the document. An element may include an attribute, which is additional information that is included between tags.

HTML can be used to link text and/or images, such as icons, to another document or section of a document. The user activates a link by clicking on it, and the linked database is directly accessed. Links are used to access related information, or to contact a person or entity. However, information on a Web page must have the requisite HTML tags to be an active link.

In the invention, the client selects a hyperlink request for a text or image file on the Web. The Internet terminal forwards the request to the GW using the GWIP protocol. If the page in question contains embedded images, the Internet terminal forwards additional, parallel requests for the images as well.

The GW simplifies the transmission of requested Internet data, as compared to the prior art. Because the GW handles the protocol negotiation with the Internet data server, it does not need to be negotiated over the slow link. The design of the Internet terminal may therefore be simplified and the amount of traffic over the slow link reduced. Experimental data has shown that the GW is approximately 20% more efficient than a prior art TCP/IP stack connection over PPP.

Figure 6:
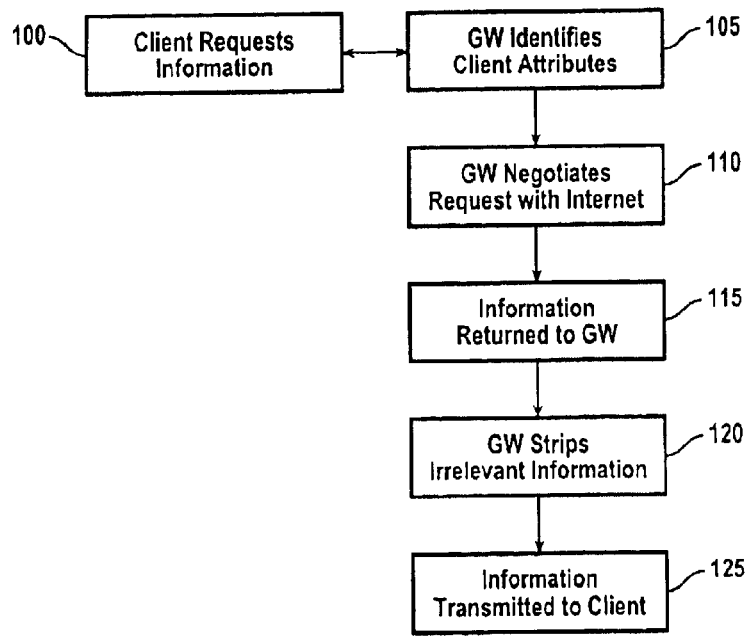
FIG. 6 is a flow chart of the filtering process according to the invention.

In the preferred embodiment of the invention, the GW also pre-processes, filters and simplifies the actual data by reducing the amount of information that is irrelevant to the display environment that has been identified by the GW. This information can be reduced by such methods as stripping out information, optimizing, compressing, and by generally reducing size. FIG. 6 is a flowchart of the filtering process according to the invention. The client initiates a request to the GW for information from the Internet (100). The GW either identifies (105) or is pre-programmed with a client's attributes.

The GW then negotiates the request with the Internet (110) and retrieves the requested information (115). The GW filters the Internet information by reducing the amount of information that is not relevant to the client's attributes (120). The GW then sends to the client only that information which is needed (120). Therefore, bandwidth is not wasted on irrelevant or useless information and the client's processor does not have to process the unnecessary information. The size or power of the Internet terminal processor can therefore be reduced as compared to the prior art, resulting in cost and maintenance savings to the client.

For example, extra (redundant) color information is removed from images, or is reduced according to the physical characteristics of the display. Thus, if the receiving internet access terminal has a gray scale display, there is no need to transmit the color-related information over the slow link.

The GW reduces the amount of this irrelevant information in the HTML coding of a Web page before the page is transmitted over the low bandwidth link to the client. Data pages can also be stripped of redundant blank characters, or converted to a more efficiently compressed equivalent data format. This results in improved usage of the bandwidth of the slow link. Experimental data has shown that by pre-processing, filtering, and simplifying the actual data, the GW is approximately 10% more efficient than the prior art.

The invention uses a low-power compression/decompression scheme, such as run-length encoding (RLE). This data compression scheme converts a "run" of identical characters into a code. Using this two-dimensional run-length compression, the GW compresses data on the fly without a lot of complex looking-back or looking-ahead. Such two-dimensional run-length compression looks in both vertical and horizontal directions at any given coordinate.

The GW makes and negotiates multiple Internet requests, in parallel, for information to be fetched and loaded from the Internet using the GWIP protocol. The GW parses all requests and forwards them to the appropriate Internet server for execution. The GW filters each received file according to file type, and multiplexes the resulting data streams efficiently over the single link to the Internet terminal, based on the current priority of each stream. This allows documents to be loaded in parallel with their associated images, resulting in a much improved perceived speed. These streams can be paused and resumed as desired. Such parallel retrieval of multiple objects is performed over the slow link without the use and overhead of Internet protocols.

The GW may also be used to conveniently customize the Internet terminal. In one embodiment of the invention, a profile of the Internet terminal user is stored in the Internet terminal. The GW uses this profile to provide customized services, such as sending only thumbnail views of images, or not sending certain material. In another embodiment of the invention, the GW serves as a software upgrade server. Using the GWIP protocol, a new firmware version can easily be uploaded, or a specialized device driver such as a printer driver uploaded as necessary.

Furthermore, the GW may be used with the integrated graphical user interface (GUI) and slide-up window disclosed and described in U.S. patent application Ser. No. 08/868,132 entitled "Method and Apparatus for Organizing and Displaying Internet and Telephone Information", filed on Jun. 3, 1997, commonly owned herewith and hereby incorporated by reference as if set for the entirely herein. The invention may be used to upgrade or modify the integrated GUI as described in the aforementioned U.S. Patent Application.

In an alternative embodiment of the invention, the GW is used as an off-line agent. Thus, in situations where the Internet terminal is connected via a link which is not always available, as with dial-up phone lines, the GW performs off-line services, such as collecting e-mail, or conducting intelligent off-line searches.

The GW can be used to cache commonly used information. A GW that serves multiple Internet terminals can cache the information fetched from the Internet. This reduces overall network access and improves responsiveness. For example, the GW can maintain a local name-to-IP address table.

In one embodiment of the invention, the GW is used as a mechanism for ISPs to track and bill customers for the use of the internet connection. For example, the GW can keep track of charges that the user accepts for the privilege of accessing certain copyrighted material.

The GWIP protocol is a high-level (session layer), full duplex, point-to-point data transfer protocol. It is used between a single client, such as the Internet-compatible telephone, and a single server running the GW. The entire GWIP protocol may be encapsulated by lower-level network transport protocols, such as V42/V42.bis, X.25, or even PPP/TCP/IP. These encapsulating protocols may add compression, encryption and reliability, as required.

GWIP assumes that the underlying transport is error free. It is optimized to allow efficient asynchronous data transfer over a serial sequential medium, such as a relatively slow serial modem line.

The GWIP protocol consists of small data packets, typically about 250 bytes, which provide the capability for multiple interleaved data streams in both directions. There is no concept of "embedded," "escaped," or "out-of-band" control characters; all control information is in the form of complete GWIP packets. The GWIP described below is optimized for use with an Internet-compatible telephone. However, one skilled in the art will readily appreciate that the GWIP may be adapted to other Internet terminals, including different types of Internet-compatible telephones.

Table 1 describes the GWIP protocol structure. All GWIP packets start with a DLE character, followed by a byte, designated "len," with the length of the rest of the packet. The DLE character is a non-printable character that is used to indicate a beginning of a message. This convention provides a small measure of error-detecting redundancy over a normally error-free transport layer.

TABLE 1

| DLE | len | t | data |
| --- | --- | --- | --- |

The third byte of a GWIP packet ("t" in Table 1, above) always indicates the packet type. Additional data fields are optional. The packet type determines the packet destination and structure. Multiple-byte integer values are transmitted in network byte order (MOST significant byte first).

In most cases, the Internet terminal issues a request (a GWIP command), to which the GW responds by issuing one or more GWIP response packets. A request is always associated with a new stream. A stream comprises multiple packets that are logically associated via a common stream handle. A handle is an unsigned integer between 0 and 254 (255 is reserved). Responses use the same handle as the original request. Streams are sometimes also known as virtual channels. The GW may also issue spontaneous status and service messages that are related to one of the open streams.

A connection between the Internet terminal and the GW host (server) is always initiated by the client. As soon as a data connection is established, a configuration dependent exchange takes place between the Internet terminal and the GW host. This results in the establishment of a logical link between the Internet terminal and the GW software.

At this point, the GW waits for a special sequence of four bytes, that indicates the version of the GWIP protocol supported by the Internet terminal. The structure of this sequence is shown in Table 2, as follows:

TABLE 2

| DLE | major | minor | ETX |
| --- | --- | --- | --- |

The first byte of the sequence is the DLE character and the second byte is a (positive) major version number. The third byte is the minor version number, and the fourth byte the ETX character. ETX is a non-printable character that is frequently used to indicate the end of a message.

The discussion in this application describes an exemplary version of the GWIP protocol specification. One skilled in the art will readily recognize that other versions of the GWIP may be implemented in the invention. Thus, the following discussion is provided for purposes of example and not as a limitation on the scope of the invention.

The GW ignores all bytes that precede this version sequence. When it receives a valid version sequence, it returns a STAT_OK GW_STATUS packet (see below) to the Internet terminal and prepares to handle a regular GWIP session. The Internet terminal repeats the version sequence at, for example, 5-second intervals, until it receives the GW_STATUS packet. The Internet terminal disconnects if no valid response is received after three attempts. This disconnection resets the GW.

Unless specified differently, the word "command" indicates a packet that originates from the Internet terminal terminal; the word "response" refers to a GW initiated packet. types. Most GWIP packet types are used both as commands and response, but may have different formats.

Some commands, such as GW_LOGIN, GW_CONFIG and GW_ANCHOR, have additional command fields. Table 3 shows the GW_LOGIN command. Command fields are pairs of the field "name" (a one byte enumerator), followed by the field "value." Each command field is preceded by a one-byte length field, indicating the total length of the command field.

TABLE 3

| DLE | len | type | authentication fields |
| --- | --- | --- | --- |

Every GWIP session starts with a GW_LOGIN Internet terminal command. This authenticates the Internet terminal. The authentication includes the fields listed in Table 4:

TABLE 4

| field | name | value length (bytes) |
| --- | --- | --- |
| Internet terminal serial ID (unique) | LOG_SERID | 4 |
| boot-section/Internet terminal version id | LOG_BOOTVER | 4 |
| firmware version id | LOG_FIRMVER | 4 |
| user name (id) | LOG_USER | string |
| password | LOG_PASSWD | string |
| 0 . . . | | |

The GW replies with a GW_STATUS response message, with a status STAT_OK, followed by an optional GW_SERVICE message. Any other response, or no response at all, causes the Internet terminal to disconnect.

The only valid commands after GW_LOGIN are GW_CONFIG, GW_LOGOUT, and GW_UPGRADE. The GW_LOGOUT command packet is shown in Table 5.

TABLE 5

| DLE | len | type |
| --- | --- | --- |

The proper way for an Internet terminal to terminate a session is to send a GW_LOGOUT command, and then to wait for the GW_LOGOUT response. A session may also end as a result of the Internet terminal disconnecting deliberately, or as a result of a communication fault or other error.

The GW_LOGOUT response to the Internet terminal GW_LOGOUT command is shown in Table 6. The log out message is optional. After receiving the GW_LOGOUT response, the Internet terminal disconnects from the line.

TABLE 6

| DLE | len | type | logout msg |
| --- | --- | --- | --- |

A GW_CONFIG command is sent by the Internet terminal to the GW immediately after the GW_LOGIN command. The GW_CONFIG command may be repeated at any time after the GW_LOGIN command. GW_CONFIG informs the GW about the user's preference/configuration table, including the language in which service messages must be sent, image preference options, and time out values. All values must be valid. The GW_CONFIG command is shown in Table 7.

TABLE 7

| DLE | len | type | PI_type | configuration fields |
| --- | --- | --- | --- | --- |

The one-byte PI_type field determines the plug-in or GW sub-system that is concerned with these configuration values. Typically, the Internet terminal will send a number of GW_CONFIG commands, one for each type of sub-system or plug-in, whenever the configuration on the Internet terminal is changed by the user. Accepted values for this field include PI_EMAIL, PI_WEB and PI_GEN. The configuration fields listed in Table 8 are defined:

TABLE 8

| field | name | value length (bytes) | used by |
|---|---|---|---|
| font size | CONFIG_FONT | 1 | PL_GEN |
| image display method | CONFIG_IMG | 1 | PL_WEB |
| max image size to receive | CONFIG_MAX_IMG_SIZE | 2 | PL_WEB |
| cache refresh options | CONFIG_CACHE | 4 | PL_GEN |
| time out preference | CONFIG_TIMEOUT | 4 | PL_GEN |
| language | CONFIG_LANG | 1 | PL_GEN |
| date& time style | CONFIG_DATE | 1 | PL_GEN |
| email user id | CONFIG_EUSER | string | PL_EMAIL |
| email password | CONFIG_EPASSWD | string | PL_EMAIL |
| Ö . . . | | | |

The GW responds with a GW_CONFIG response to confirm receipt of the GW_CONFIG command. The Internet terminal does not issue any other type of commands before it receives the GW_CONFIG response. The GW_CONFIG command is thus a synchronization point between the Internet terminal and the GW.

A GW_ANCHOR command is an Internet terminal request for a new hypertext/image file. In an HTML document, the anchor is the format codes that are used to define a link to another page. The handle (h) field identifies the data stream and relates the request with subsequent GW response packets. The 2-byte "width" field indicates the width of the pane, in pixels, in which the information will be displayed. This command packet is followed by one or more GW_DATA packets that include the anchor Uniform Resource Locator (URL), and is terminated by a GW_EOF packet. The GW responds with a GW_ANCHOR response, followed by GW_DATA packets, terminated by GW_EOF. The GW_ANCHOR command is given in Table 9.

TABLE 9

| DLE | len | type | h | width |
|---|---|---|---|---|

A GW_REFRESH command is an Internet terminal request for the re-transmission of a hypertext/image document that is partially or fully in the Internet terminal cache. The handle (h) field identifies the data stream and relates the request with subsequent GW response packets. The 2-byte "width" field indicates the width of the pane, in pixels, in which the information will be displayed. THe GW_REFRESH command is shown in Table 10.

TABLE 10

| DLE | len | type | h | width | skip-len | creation date |
|---|---|---|---|---|---|---|

The 2-byte "skip-len" field indicates how many data bytes must be skipped by the GW before sending the actual data. This is useful if a file was partially received and cached by the Internet terminal in a previous transmission, and does not need to be fully re-transmitted.

The 6-byte "creation date" field indicates the creation date of the currently cached document. This command packet is followed by one or more GW_DATA packets that include the anchor URL, and is terminated by a GW_EOF packet.

The GW responds with a GW_ANCHOR response. If the file in the cache is up-to-date, the AN_CACHE_VALIDITY field of the GW_ANCHOR header will indicate that the cache is up-to-date (CACHE_VALID). Otherwise, the AN_CONTENT field will be CACHE_REPLACE or CACHE_DONT, and the value of skip-len will be ignored and the entire file will be re-transmitted. The GW_ANCHOR response will be followed by zero or more appropriate GW_DATA packets, and terminated by a GW_EOF.

A GW_POST command is a form-request, transmitted via the HTTP POST method. The handle (h) field identifies the data stream and optionally relates the request with GW response packets. The GW responds with a GW_ANCHOR response, with a AN_CACHE_VALIDITY field of value CACHE_DONT, followed by GW_DATA packets. Responses to GW_POST are never cached. This command packet is followed by one or more GW_DATA packets that include the anchor URL and the posted text, and is terminated by a GW_EOF packet. The GW_POST command is given in Table 11.

TABLE 11

| DLE | len | type | h | width |
|---|---|---|---|---|

The GW indicates its intention to send the requested GW_ANCHOR or GW-POST information by responding with a GW_ANCHOR response. A relatively long time may pass between the GW_ANCHOR or GW_POST command and the GW_ANCHOR response, due to network delays. The header information may include the creation data/time, content type, compression and display method. The GW_ANCHOR response is given in Table 12.

TABLE 12

| DLE | len | type | h | hdr info fields |
|---|---|---|---|---|

The following anchor fields are defined:

TABLE 13

| field | name | value length (bytes) |
|---|---|---|
| creation time-stamp | AN_CREATION | 4 (time_t) |
| cache validity | AN_CACHE VALIDITY | 1 |
| content type | AN_CONTENT | 1 |
| Ö. | | |

The GW then follows this with a sequence of GW_DATA response packets, terminated by a GW_EOF response. (Also see GW_ACK, described below). if a file cannot be retrieved, or if there is an unreasonably long time-out, the Internet terminal will usually cancel the GW_ANCHOR request via a GW_ENDSTREAM command.

GW_DATA packets are used to send data streams, such as bitmap data, from the Internet terminal to the GW, or vice-versa. Each GW_DATA packet contains a handle that relates this packet to the specific stream. Data streams are terminated by a GW_EOF packet. An informational percent byte, with a value between 1 and 100, indicates an estimated percentage of how much has been transmitted, including the package. A percent of 0% indicates that the sender does not know, or does not care to compute, the estimated percentage. The GW_DATA packet is given in Table 14.

TABLE 14

| DLE | len | type | h | % | data ... |
|---|---|---|---|---|---|

The Internet terminal acknowledges each received datapacket of type GW_DATA by sending a GW_ACK command. This allows the GW to send another packet, without overflowing the Internet terminal input buffers, and prevents unwanted data from piling up in internal UNIX (host) serial driver and modem buffers. The Internet terminal may also, at regular time intervals, send GW_ACK commands to the GW to indicate that it is alive. GW_DATA packets sent by the Internet terminal to the GW are not acknowledged by the GW. The GW_ACK command is shown in Table 15.

TABLE 15

| DLE | len | type | h |
|---|---|---|---|

The GW_PRI command is provided to the GW to recommend the priority order for the transmission of packets of concurrent existing streams. The priority is provided in "pri," a one-byte non-negative value. The GW does not echo these commands. Initially, a stream is of priority ten. The GW_PRI command is given in Table 16.

TABLE 16

| DLE | len | type | h | pri |
|---|---|---|---|---|

A priority of zero indicates that the stream is out of sight, This is usually true for images, when the user scrolls the screen. The GW sends data of all higher priority data streams first, in round-robin fashion, and only then sends data packets for lower priority streams. In the preferred embodiment of the invention, the values zero and ten only are used. However, alternative embodiments of the invention may use any appropriate priority values.

While the Web uses HTML coding for documents, the invention is also readily adapted for use with Internet access devices that require different document formats. In the preferred embodiment of the invention, the HTML layout is converted to an equivalent of the HTML layout. Alternative embodiments of the invention do not convert the HTML layout, or convert the HTML to different browser formats. For example, an HTML page can be converted into formats accessible by a Web telephone, a cellular phone, or a personal digital assistant having a wireless phone.

The layout conversion is performed, for example, by the server, client, Internet-capable telephone, Internet access device, or by a computer networked to the Internet-capable telephone or Internet access device. Further, such conversion may be an HTML-to-HTML conversion, for example as provided by a plug-in that operates in a connection with a conventional Web browser, such as Navigator, manufactured by Netscape Communications Corporation of Mountain View, Calif.

One embodiment of the invention is upgradeable via downloading from the Web. The HTML coding may thereby be readily modified to provide new features, update existing features, or to comply with different protocols. This HTML is then translated, as necessary.

The telephone numbers on a displayed Web page may be iconified and dialed, for example, as described in Method And Apparatus For Iconifying And Automatically Dialing Telephone Numbers Which Appear On A Web Page, also assigned to InfoGear Technology Corp. of Redwood City, Calif., filed in the U.S. Patent and Trademark Office herewith and incorporated as a part hereof. These iconified telephone numbers may be added to an address book maintained as part of the invention.

Although the invention is described herein with reference to the preferred embodiment, one skilled in the art will readily appreciate that other applications may be substituted for those set forth herein without departing from the spirit and scope of the present invention.

For example, while the Preferred embodiment of the invention is adapted for use with a serial link, the teachings of the invention are readily applicable to any type of slow link.

Accordingly, the invention should only be limited by the claims included below.

What is claimed is:

1. A method for accessing network information during a communication session between a client terminal and a host, said method comprising:

identifying, using an intermediary component located between the client terminal and the host, configuration information on the client terminal, said configuration information specifying a physical display parameter of the client terminal;

forwarding a request for network information received at said intermediary component from the client terminal to the host;

retrieving from the host a data set responsive to the request in accordance with the physical display parameter of the client terminal set forth in the configuration information, said retrieving performed using said intermediary component;

after retrieving the data set, filtering the data set at said intermediary component to reduce the amount of display information contained in the data set; and transmitting said filtered data set from said intermediary component to the client terminal.

2. The method of claim 1, wherein said retrieving includes decompressing a portion of the data set.

3. The method of claim 1, further comprising: accounting for use of the client terminal during the communication session.

4. The method of claim 1, wherein said client terminal is an Internet compatible telephone.

5. The method of claim 1, further comprising: forwarding a command to perform an off-line search received from the client terminal to the host.

6. The method of claim 1, further comprising:

creating a user profile of the client terminal at the client terminal;

storing the user profile in a memory associated with the client terminal; and causing information delivered to the client terminal to be customized in accordance with the user profile in response to said issuing.

7. The method of claim 1, further comprising:

forwarding a software upgrade request received from the client terminal to the host to cause an upgrade of a software unit on the client terminal.

8. A method of using a host for conducting a communication session between a client terminal and a host, the host hosting information, the method comprising:

receiving an initiation command at the host from the client terminal to initiate a communications link between the client terminal and the host;

obtaining configuration information at the host from the client terminal, the configuration information specifying characteristics of the client terminal;

receiving a first plurality of requests at the host from the client terminal;

sending a component of each request among the first plurality of requests from the host to a corresponding network server among a second plurality of network servers;

procuring at the host a third plurality of data sets from the second plurality of network servers, wherein each data set among the third plurality of data sets is responsive to an associated request among the first plurality of requests;

transforming at the host a portion of each data set among the third plurality of data sets into a fourth plurality of transformed data sets in accordance with the configuration information; and multiplexing from the host to the client terminal said fourth plurality of transformed data sets.

9. The method of claim 8, wherein said transforming includes filtering said portion of each data set among the third plurality of data sets to reduce the amount of display information.

10. The method of claim 8, comprising further accounting for use of the client terminal during the communication session.

11. The method of claim 8, wherein said client terminal is an Internet compatible telephone.

12. The method of claim 8, further comprising:
causing information delivered to the client terminal to be customized in accordance with a user profile.

13. The method of claim 8, further comprising:
forwarding a software upgrade request received from the client terminal to the host to cause an upgrade of a software unit on the client terminal.

14. An apparatus for accessing network information during a communication session between a client terminal and a host, said apparatus comprising:

an identification module configured to identify, using an intermediary component located between the client terminal and the host, configuration information on the client terminal, said configuration information specifying a physical display parameter at the client terminal;

a forwarding module configured to forward a request for network information received at said intermediary component from the client terminal to the host;

a retrieving module configured to retrieve from the host a data set responsive to the request in accordance with the display requirements of the client terminal set forth in the configuration information, said retrieving module located at said intermediary component;

a filtering module configured to filter out information from the data set at said intermediary component that is irrelevant to a display configuration of the client terminal after retrieving the data set; and a transmitting module configured to transmit said filtered data set from said intermediary component to the client terminal.

15. An apparatus in accordance with claim 14, wherein said filtering module is further configured to decompress a portion of the data set.

16. An apparatus in accordance with claim 14, further comprising: an accounting module configured to account for use of the client terminal during the communication session.

17. An apparatus in accordance with claim 14, wherein the client terminal is an Internet compatible telephone.

18. An apparatus in accordance with claim 14, further comprising: a sending module configured to send to the host a command to perform an off-line search received from the client terminal.

19. An apparatus in accordance with claim 14, further comprising:

a creating module configured to create a user profile of the client terminal at the client terminal;

a storing module configured to store the user profile in a memory associated with the client terminal; and a customization module configured to cause information delivered to the client terminal to be customized in accordance with the user profile in response to issuing the configuration information.

20. An apparatus in accordance with claim 14, further comprising:

a sending module configured to send a software upgrade request received from the client terminal to the host to cause an upgrade of a software unit on the client terminal.

21. An apparatus for conducting a communication session between a client terminal and a host, the host hosting information, the apparatus comprising:

a retrieving module configured to retrieve an initiation command from the client terminal to the host to initiate a communications link between the client terminal and the host;

an obtaining module configured to obtain information from the client terminal, the configuration information specifying characteristics of the client terminal;

a receiving module configured to receive a first plurality of requests from the client terminal;

a sending module configured to send a component of each request among the first plurality of requests from the host to a corresponding network server among a second plurality of network servers;

a procuring module configured to procure a third plurality of data sets from the second plurality of network servers, wherein each data set among the third plurality of data sets is responsive to an associated request among the first plurality of requests;

a transforming module configured to transform at the host a portion of each data set among the third plurality of data sets into a fourth plurality of transformed data sets in accordance with the configuration information; and a multiplexing module configured to multiplex from the host to the client terminal said fourth plurality of transformed data sets.

22. The apparatus of claim 21, wherein said transforming module includes a filtering module configured to filter said portion of each data set among the third plurality of data sets to reduce the amount of display information.

23. The apparatus of claim 21, comprising further an accounting module for accounting for use of the client terminal during the communication session.

24. The apparatus of claim 21, wherein said client terminal is an internet compatible telephone.

25. The apparatus of claim 21, further comprising:
a customization module configured to cause information delivered to the client terminal to be customized in accordance with a user profile.

26. The apparatus of claim 21, further comprising:
a forwarding module configured to forward a software upgrade request received from the client terminal to the host to cause an upgrade of a software unit on the client terminal.

27. A program storage device readable by a machine, tangibly embodying a program of instructions executable by the machine to perform a method for accessing network information during a communication session between a client terminal and a host, said method comprising:

identifying, using an intermediary component located between the client terminal and the host, configuration information on the client terminal, said configuration information specifying a physical display parameter of the client terminal;

forwarding a request for network information received at said intermediary component from the client terminal to the host;

retrieving from the host a data set responsive to the request in accordance with the physical display parameter of the client terminal set forth in the configuration information, said retrieving performed using said intermediary component;

after retrieving the data set, filtering the data set at said intermediary component to reduce the amount of display information contained in the data set; and transmitting said filtered data set from said intermediary component to the client terminal.

28. A device in accordance with claim 27, wherein said retrieving includes decompressing a portion of the data set.

29. A device in accordance with claim 27 wherein said method further comprises:

accounting for use of the client terminal during the communication session.

30. A device in accordance with claim 27, wherein said client terminal is an Internet compatible telephone.

31. A device in accordance with claim 27 wherein said method further comprises:

forwarding a command to perform an off-line search received from the client terminal to the host.

32. A device in accordance with claim 27 wherein said method further comprises:

creating a user profile of the client terminal at the client terminal;

storing the user profile in a memory associated with the client terminal; and causing information delivered to the client terminal to be customized in accordance with the user profile in response to said issuing.

33. A device in accordance with claim 27 wherein said method further comprises:

forwarding a software upgrade request received from the client terminal to the host to cause an upgrade of a software unit on the client terminal.

34. A program storage device readable by a machine, tangibly embodying a program of instructions executable by the machine to perform a method for conducting a communication session with a host between a client terminal and a host, the host hosting information, said method comprising:

retrieving an initiation command at the host from the client terminal to initiate a communications link between the client terminal and the host;

obtaining configuration information at the host from the client terminal, the configuration information specifying characteristics of the client terminal;

receiving a first plurality of requests at the host from the client terminal;

sending a component of each request among the first plurality of requests from the host to a corresponding network server among a second plurality of network servers;

procuring at the host a third plurality of data sets from the second plurality of network servers, wherein each data set among the third plurality of data sets is responsive to an associated request among the first plurality of requests;

transforming at the host a portion of each data set among the third plurality of data sets into a fourth plurality of transformed data sets in accordance with the configuration information; and multiplexing from the host to the client terminal said fourth plurality of transformed data sets.

35. The device of claim 34, wherein said transforming includes filtering said portion of each data set among the third plurality of data sets to reduce the amount of display information.

36. The device of claim 34, wherein the method further comprises accounting for use of the client terminal during the communication session.

37. The device of claim 34, wherein said client terminal is an internet compatible telephone.

38. The device of claim 34, wherein the method further comprises:

causing information delivered to the client terminal to be customized in accordance with a user profile.

39. The device of claim 34, wherein the method further comprises:

forwarding a software upgrade request received from the client terminal to the host to cause an upgrade of a software unit on the client terminal.

40. An apparatus for accessing network information during a communication session between a client terminal and a host, said apparatus comprising:

means for identifying, using an intermediary component located between the client terminal and the host, configuration information on the client terminal, said configuration information specifying a physical display parameter of the client terminal;

means for forwarding a request for network information received at said intermediary component from the client terminal to the host;

means for retrieving from the host a data set responsive to the request in accordance with the physical display parameter of the client terminal set forth in the configuration information, said retrieving performed using said intermediary component;

means for after retrieving the data set, filtering the data set at said intermediary component to reduce the amount of display information contained in the data set; and means for transmitting said filtered data set from said intermediary component to the client terminal.

41. An apparatus in accordance with claim 40, wherein said means for filtering includes means for decompressing a portion of the data set.

42. An apparatus in accordance with claim 40, further comprising:

means for accounting for use of the client terminal during the communication session.

43. An apparatus in accordance with claim 40, wherein said client terminal is an Internet compatible telephone.

44. An apparatus in accordance with claim 40, further comprising: means for forwarding a command to perform an off-line search received from the client terminal to the host.

45. An apparatus in accordance with claim 40, further comprising:

means for creating a user profile of the client terminal at the client terminal;

means for storing the user profile in a memory associated with the client terminal; and means for causing information delivered to the client terminal to be customized in accordance with the user profile in response to said means for issuing.

46. An apparatus in accordance with claim 40, further comprising:

means for sending a software upgrade request received from the client terminal to the host to cause an upgrade of a software unit on the client terminal.

47. An apparatus for conducting a communication session between a client terminal and a host, the host hosting information wherein the apparatus is an intermediary component and located between the client terminal and the host, the apparatus comprising:

means for forwarding an initiation command received from the client terminal to the host to establish a communications link between the client terminal and the host;

means for obtaining configuration information at the host from the client terminal, the configuration information specifying a physical display parameter of the client terminal;

means for accepting a request for information at the host from the client terminal;

means for sending a component of the request to the host;

means for receiving a data set from the host in response to said sending;

means for transforming the data set in accordance with to the configuration information, said means for transforming including means for filtering the data set at the host, after receiving the data set from the network server, to reduce the amount of information contained in the data set; and means for transmitting the transformed data set to the client terminal.

48. An apparatus in accordance with claim 47, wherein said means for filtering includes means for stripping redundant characters contained in the data set.

49. An apparatus in accordance with claim 47, wherein said means for filtering includes means for compressing a portion of the data set.

50. An apparatus in accordance with claim 47, further comprising:

means for accumulating a portion of the data set into a cache memory associated with the host.

51. An apparatus in accordance with claim 47, further comprising:

means for accounting for the client terminal's use of the host during the communication session.

52. An apparatus in accordance with claim 47, further comprising:

means for receiving a command from the client terminal to perform an off-line search.

53. An apparatus in accordance with claim 47 further comprising:

means for receiving a request from the client terminal to upgrade a software unit on the client terminal; and means for upgrading the software unit on the client terminal from the host, said means for upgrading responsive to the request.

54. An apparatus for conducting a communication session between a client terminal and a host, the host hosting information, the apparatus comprising:

means for retrieving an initiation command from the client terminal to initiate a communications link between the client terminal and a host;

means for obtaining configuration information from the client terminal, the configuration information specifying characteristics of the client terminal;

means for receiving a first plurality of requests from the client terminal;

means for sending a component of each request among the first plurality of requests from the host to a corresponding network server among a second plurality of network servers;

means for procuring a third plurality of data sets from the second plurality of network servers to the host, wherein each data set among the third plurality of data sets is responsive to an associated request among the first plurality of requests;

means for transforming at the host a portion of each data set among the third plurality of data sets into a fourth plurality of transformed data sets in accordance with the configuration information; and means for multiplexing from the host to the client terminal said fourth plurality of transfigured data sets.

55. The apparatus of claim 54, wherein said means for transforming includes means for filtering said portion of each data set among the third plurality of data sets to reduce the amount of display information.

56. The apparatus of claim 54, comprising further means for accounting for use of the client terminal during the communication session.

57. The apparatus of claim 54, wherein said client terminal is an internet compatible telephone.

58. The apparatus of claim 54, further comprising:

means for causing information delivered to the client terminal to be customized in accordance with a user profile.

59. The apparatus of claim 54, further comprising:

means for forwarding a software upgrade request received from the client terminal to the host to cause an upgrade of a software unit on the client terminal.

* * * * *

UNITED STATES PATENT AND TRADEMARK OFFICE
CERTIFICATE OF CORRECTION

PATENT NO. : 6,845,102 B1
DATED : January 18, 2005
INVENTOR(S) : Bendelac et al.

It is certified that error appears in the above-identified patent and that said Letters Patent is hereby corrected as shown below:

Column 2,
Line 64, replace "5,259,940" with -- 5,250,940 --.

Signed and Sealed this

Sixth Day of September, 2005

JON W. DUDAS
*Director of the United States Patent and Trademark Office*